Figure 10:
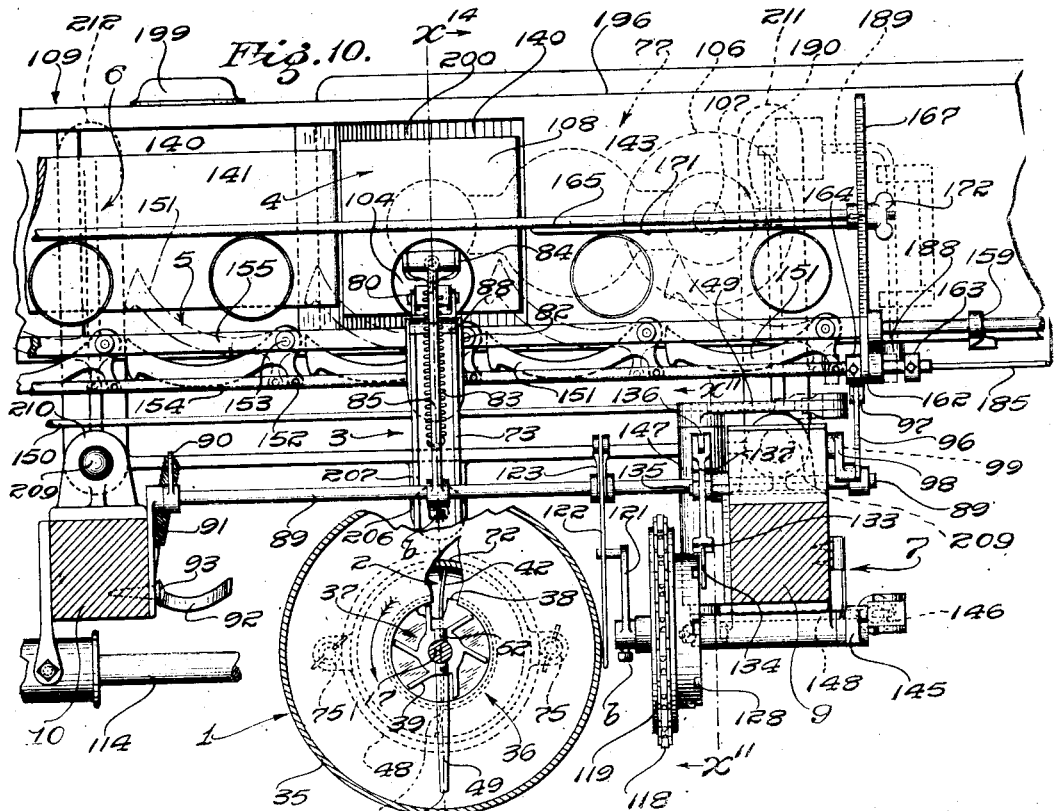

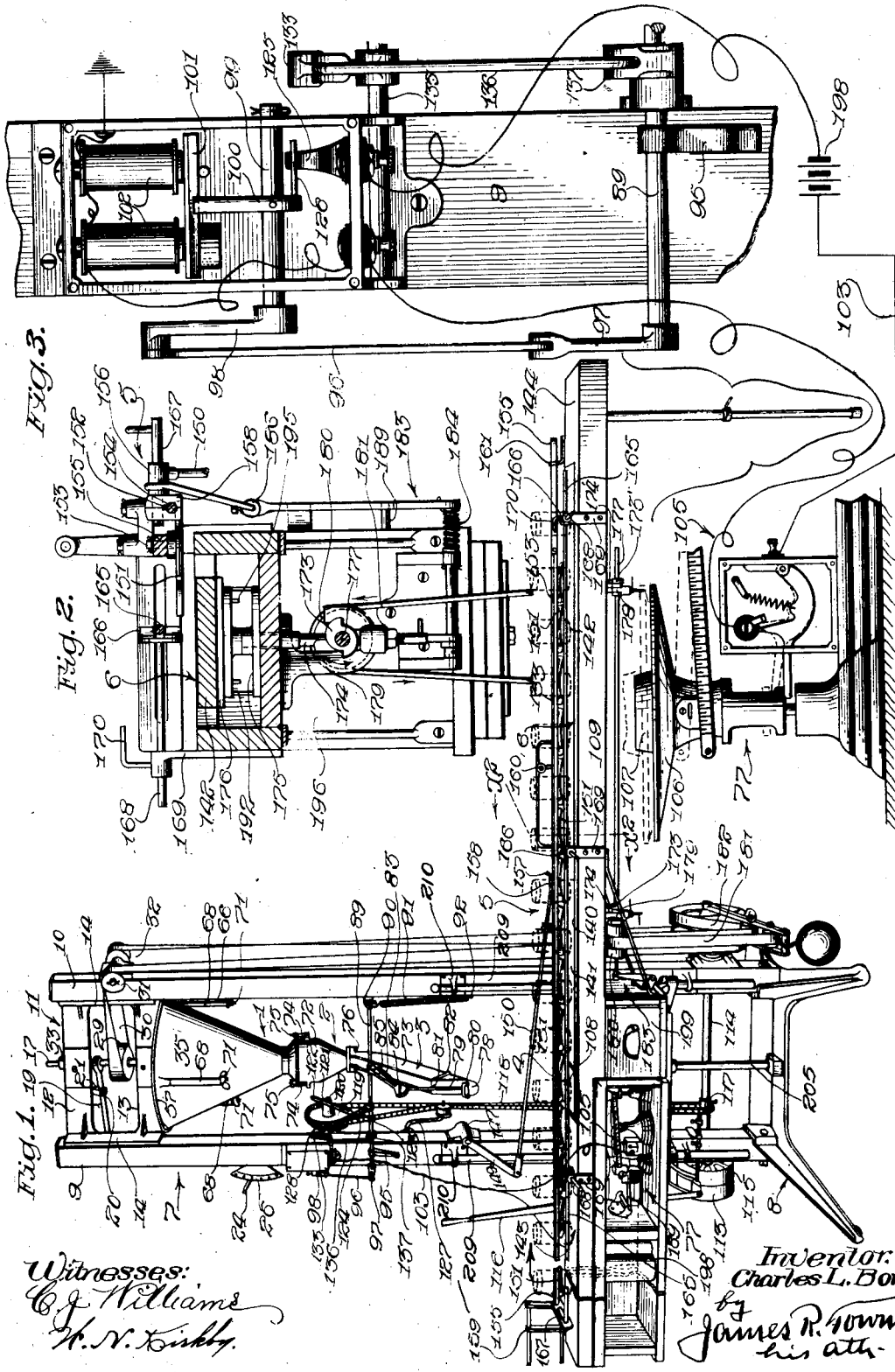

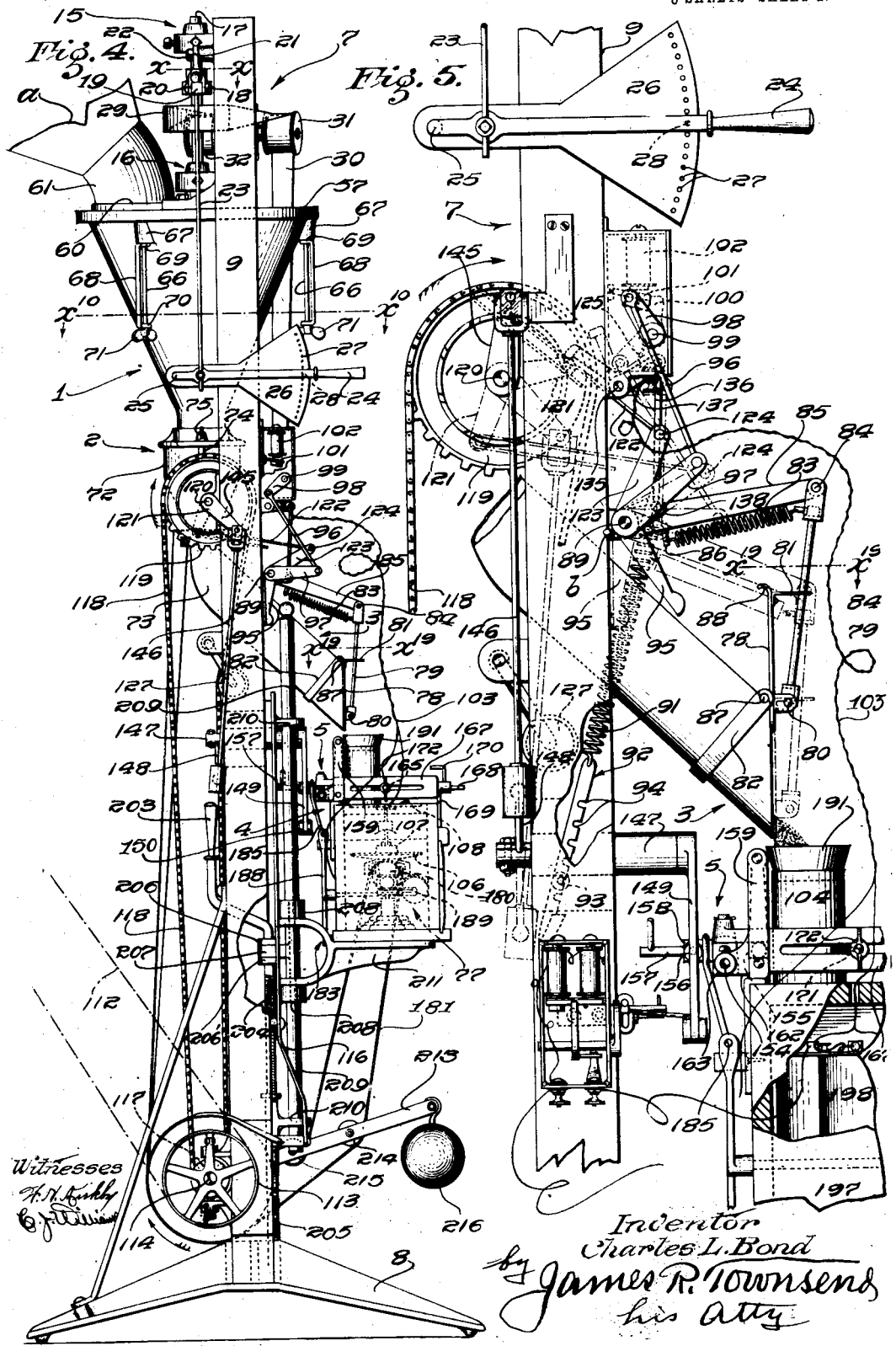

C. L. BOND.
AUTOMATIC WEIGHER.
APPLICATION FILED OCT. 28, 1909.
1,087,078.
Patented Feb. 10, 1914.
8 SHEETS—SHEET 3.
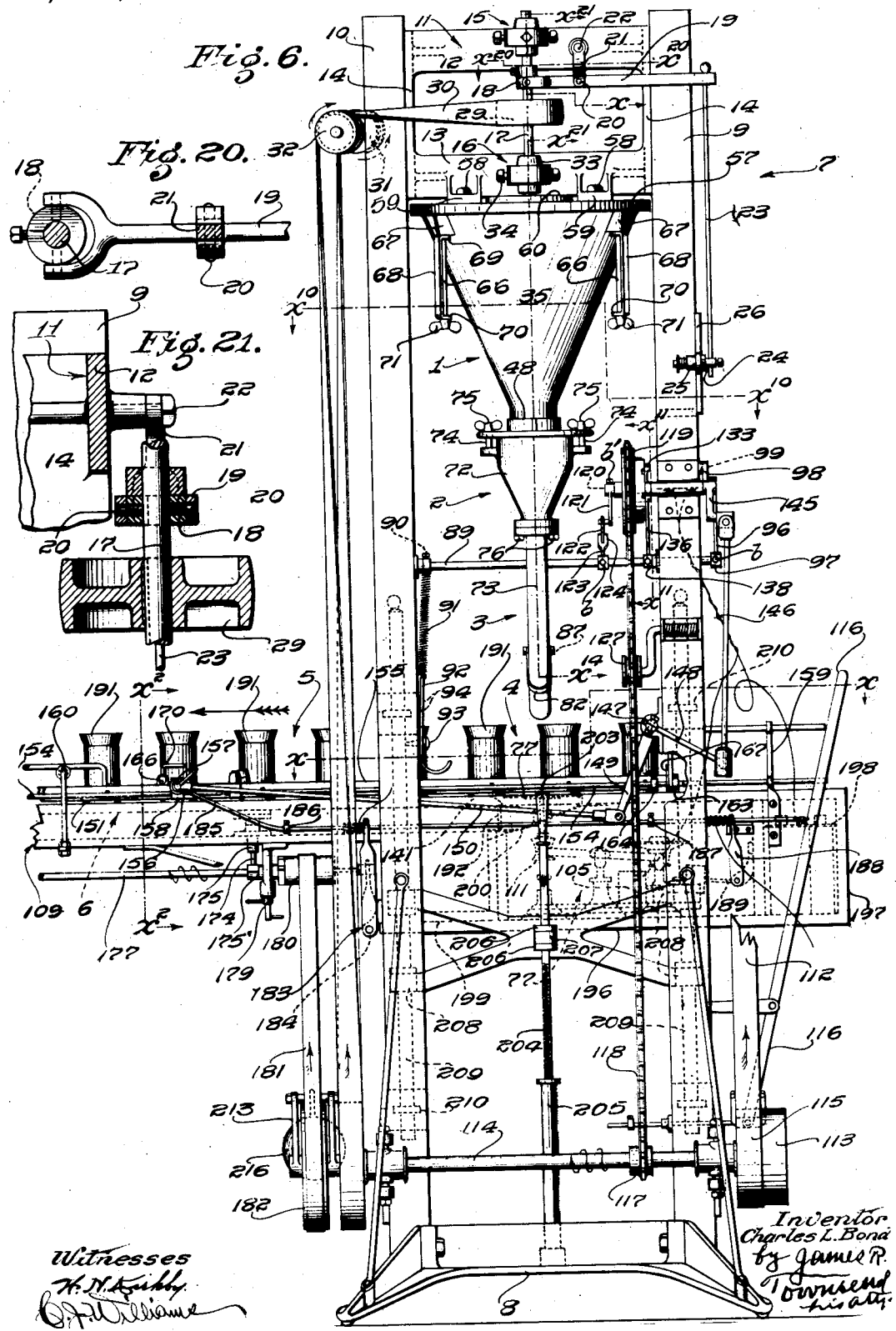
Witnesses
H. N. Kirby
B. F. Williams
Inventor
Charles L. Bond
by James R. Townsend
his atty.

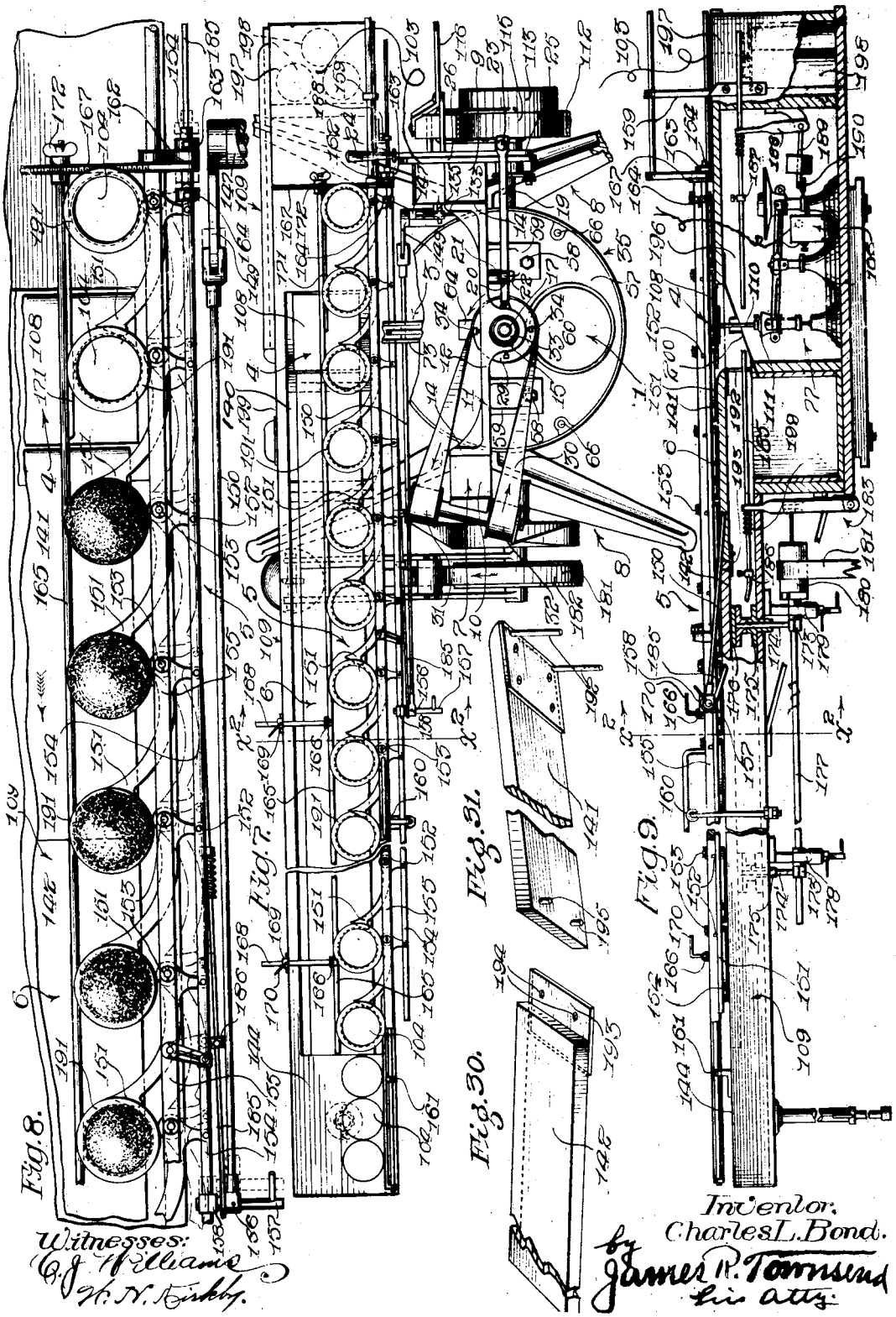

C. L. BOND.
AUTOMATIC WEIGHER.
APPLICATION FILED OCT. 28, 1909.

1,087,078.

Patented Feb. 10, 1914.
8 SHEETS—SHEET 5.

Witnesses

Inventor
Charles L. Bond

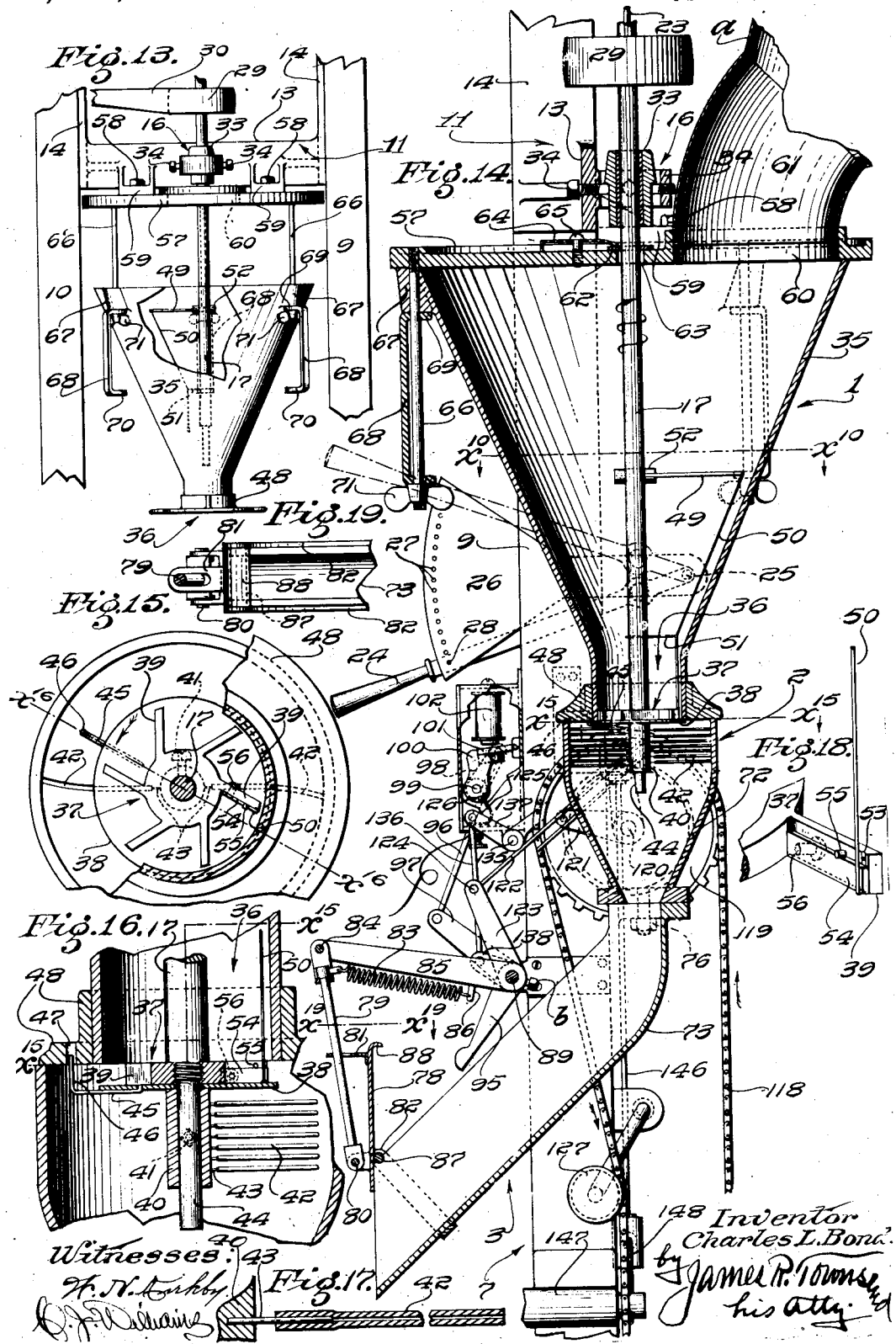

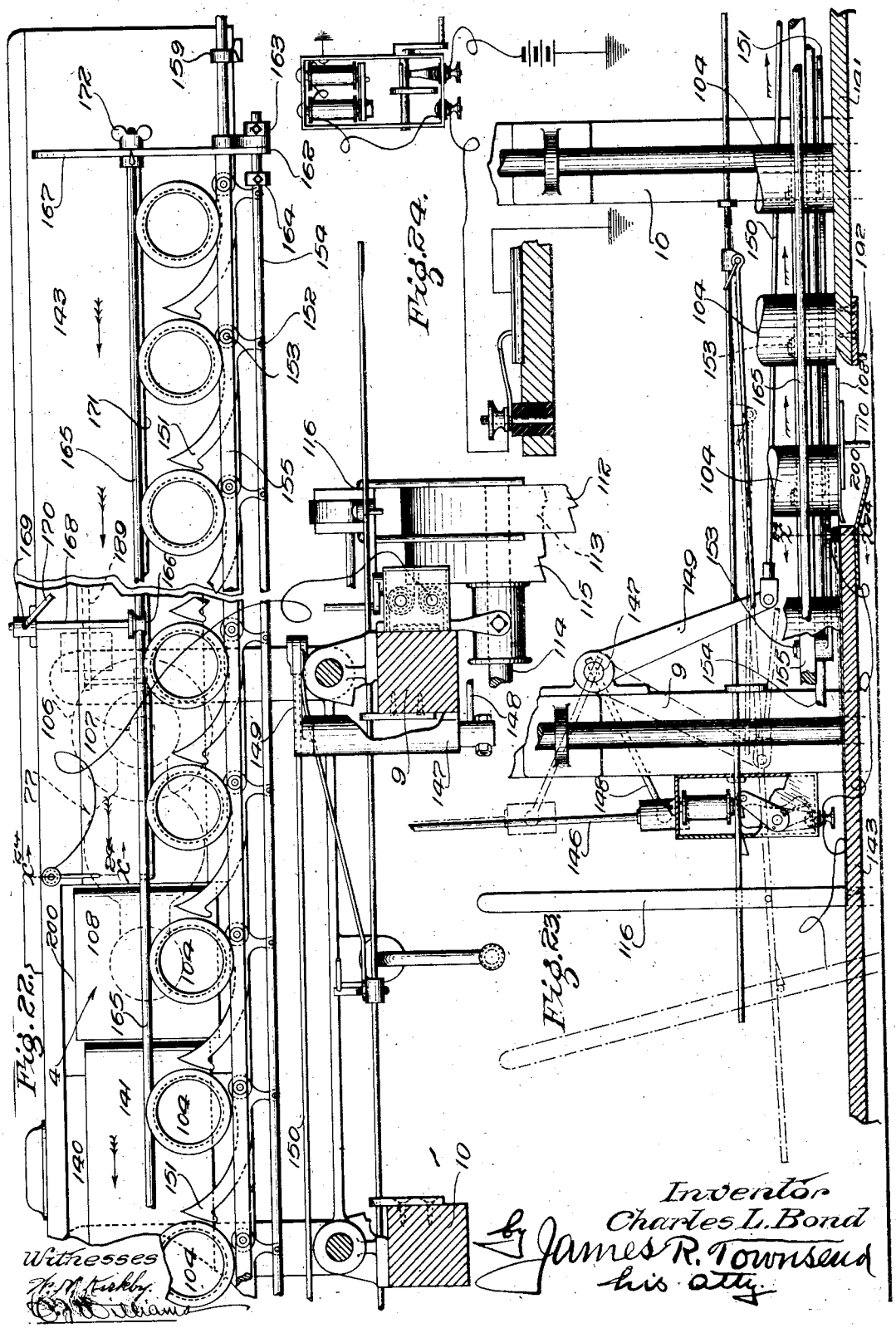

C. L. BOND.
AUTOMATIC WEIGHER.
APPLICATION FILED OCT. 28, 1909.
1,087,078.
Patented Feb. 10, 1914.
8 SHEETS—SHEET 8.
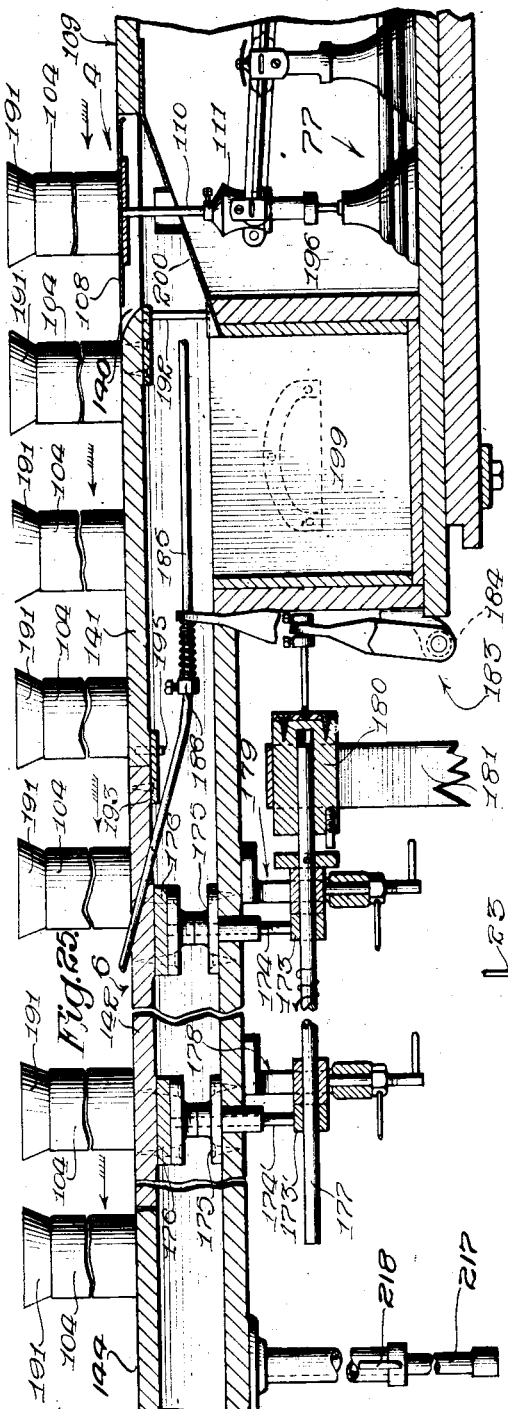
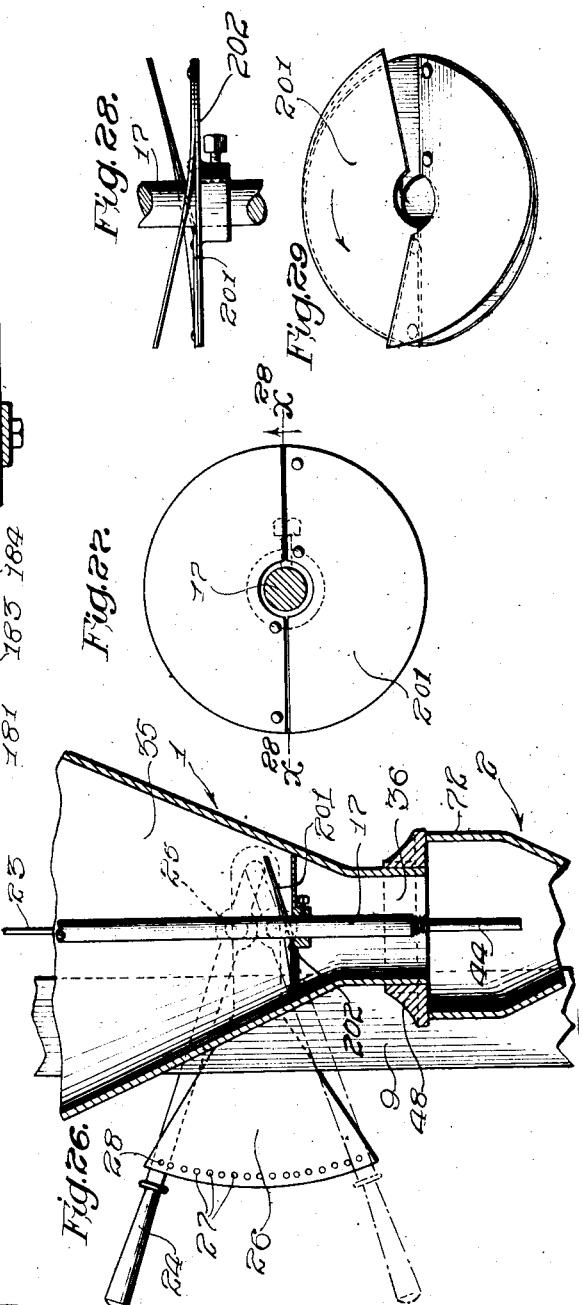
Witnesses:
Inventor,
Charles L. Bond.
by James R. Townsend
his atty

CHARLES L. BOND, OF LOS ANGELES, CALIFORNIA.

AUTOMATIC WEIGHER.

1,087,078.  Specification of Letters Patent.  Patented Feb. 10, 1914.

Application filed October 28, 1909. Serial No. 525,209.

*To all whom it may concern:*

Be it known that I, CHARLES L. BOND, a citizen of the United States, residing at Los Angeles, in the county of Los Angeles and State of California, have invented a new and useful Automatic Weigher of which the following is a specification.

An object of this invention is to provide a machine with which certain substances, otherwise very difficult to weigh automatically, can be automatically weighed with great ease and rapidity, and with absolute accuracy.

Tea and baking-powder may be named as substances which this apparatus is more particularly designed to weigh. With each of these substances it is very necessary to thoroughly settle the same into the can or other container at the time of weighing the same. This is true with regard to tea for the reason that the tea-leaves when first deposited in the receptacle lie loosely upon each other in such a manner that when a can has been filled in the ordinary manner and then subjected to the agitation usually occurring in subsequent handling of the same, the bulk rapidly settles down, thus leaving the receptacle only partially filled. In the case of baking-powder the particles of the mass when first filled into the can will occupy a much greater space than they will after the can has been subjected to the jolts, jars, and shakings of transportation and frequent handling. Therefore it is necessary that these materials be thoroughly compacted before sealing the package. Another difficulty encountered in the process of filling cans and other receptacles with tea or baking-powder, is that in the case of tea, the same is liable to clog in any apparatus that is adapted to deliver the same to the container in a limited or regulated stream, and the tea-leaves are of such a brittle character that they must be handled gently or otherwise the appearance of the same will be greatly depreciated.

The invention comprises an automatic weigher having settling mechanism, and includes means for temporarily enlarging the receptacle or filling the receptacle overfull so as to receive a bulk of loose material larger than the space allotted for the material, and means for settling this bulk of loose material into the allotted space.

The invention includes an electrical mechanism for controlling the machine from the scales as the scales are operated by the weight of material.

In some processes of automatic weighing, such as supplying cartridges with charges of explosives, it may be required that the charge when settled shall occupy less than the entire space in the receptacle; and in other processes of automatic weighing it may be necessary to only fill the receptacle heaping full, and then settle the surplus into the receptacle so that it will be level full; while in weighing baking-powder, tea, and the like, it is necessary to temporarily enlarge the receptacle in order to get a sufficient bulk of the loose material to fill the receptacle proper when the material has been settled.

An object of the invention is to accomplish the weighing and settling of the material in all of the containers therefor by simple direct mechanism, so constructed and arranged that all the containers, excepting the container which is at any particular moment being filled and weighed, are at all times easily accessible to the operator and open to his view, and readily removable from and replaceable into position without interrupting the operation of the machine. That is to say, by means of this invention every can or other receptacle excepting the one momentarily being weighed and filled, is free to be removed from the apparatus and replaced with another container at any time during the continuous operation; the filling and weighing being accomplished at a single station at which station the support for the receptacle is the scales platform by which the weighing is being done.

In the case of baking-powder the material is liable to pack in the delivering apparatus so as to prevent any rapid delivery of the same in the manner required for the purpose of automatic weighing.

An object of this invention is to provide an automatic weigher which will avoid all the objections and difficulties heretofore obtaining with regard to the automatic weighing of tea and baking-powder and materials subject to the conditions above enumerated.

This invention relates to a class of automatic weighers in which an electro-magnet is employed to effect the operation of cutting off the stream of material at such a time as to insure the deposition into the receptacle of the exact weight of mass intended to be contained therein.

Objects of the invention are:—positive action, comparative simplicity, freedom from liability of getting out of order, ready and accurate adjustment for different sizes and shapes of receptacle, and for the delivery of material for various-sized packages; also convenience and ease of operation.

This invention includes the entire machine and the various combinations and parts thereof hereinafter more particularly described, and may be embodied in various forms as a whole, and in its various parts.

I regard the invention as pioneer in that it accomplishes automatically the rapid weighing and compacting of the named materials in a manner heretofore impossible.

Various objects, advantages and basic features of novelty may appear from the subjoined detail description.

The accompanying drawings illustrate the invention.

Figures 11, 12:
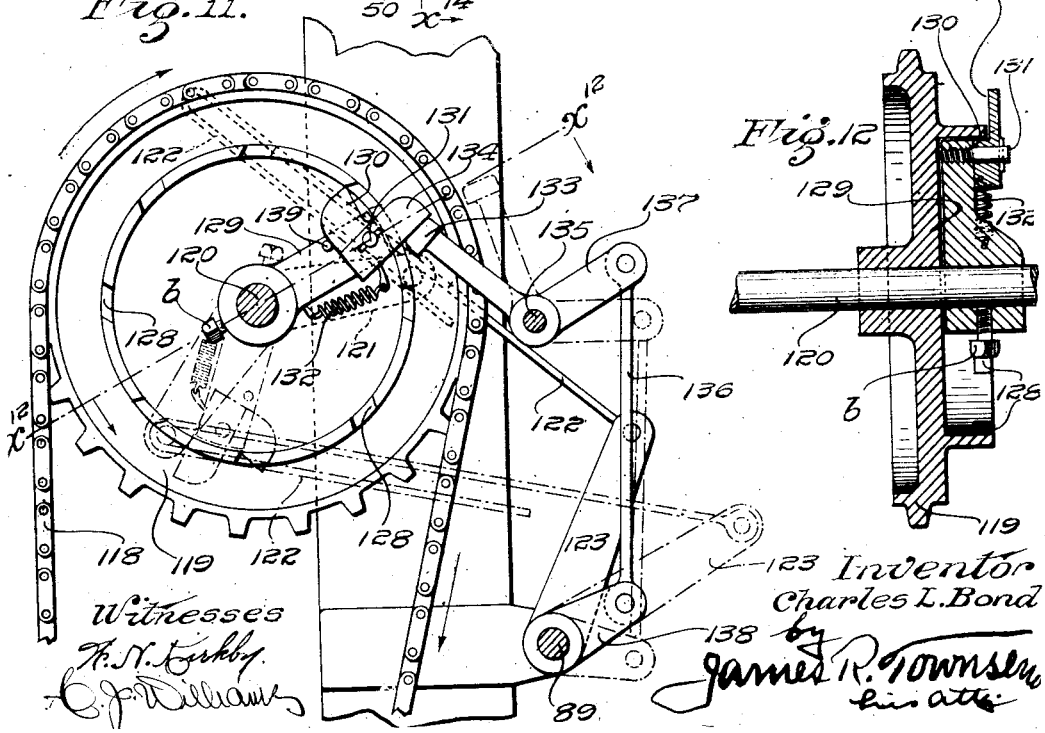

Figure 1 is a perspective view of an automatic weigher embodying the invention in a form at present deemed most desirable. The carriage and certain other parts are adjusted to position for filling long and large cans. The cut-off is shown as just closed, the conveyer having just completed its backward stroke and being at the point of commencing its forward stroke, no part of the travel having yet taken place. Fig. 2 is a fragmentary view in section through the carriage on a vertical plane indicated by $x^2-x^2$, Figs. 1, 6, 7 and 9, showing the vibrator or means for settling contents of cans before capping them. Fig. 3 is a detached fragmentary view to illustrate the means for automatically operating the cut-off. Fig. 4 is an end elevation taken from the left of Fig. 1 and the right of Fig. 6, the parts being shown in the position of Fig. 6, and the dotted position of Fig. 5; the cut-off being closed. Fig. 5 is an enlarged fragmentary detail of parts shown in Fig. 4, the cut-off and the means for operating the conveying mechanism being shown. The cut-off is shown open in solid lines and closed in broken lines. Fig. 6 is a fragmentary rear elevation showing the carriage adjusted for filling short cans, and operative parts in position they occupy when the cut-off is just about to open at the close of the forward stroke of the conveyer, which at the completion of such stroke will seat an empty can directly over the scale-pan, as shown in Fig. 8, and directly underneath the chute. Fig. 7 is a fragmentary plan showing the apparatus in operation, the conveyer having completed about half its forward stroke, at which time the can last filled is being shifted from the scale-pan and an empty can is being shifted thereonto. Portions of the hopper and the chute are broken away to expose the conveyer and the cans. This view is taken looking from the rear side of the machine to correspond with Fig. 9. Fig. 8 is an enlarged fragmental plan of the carriage, showing the position of parts at the completion of the forward stroke of the conveyer. The can last filled has been shifted from the scale-pan and an empty can has been shifted to the center of the scale-pan ready to receive material from the chute. Dotted lines indicate the position of the conveyer-fingers when the same are ready to be retracted. Fig. 9 is a fragmental rear elevation of the lower part of the machine. Parts are shown in section. Fig. 10 is a fragmentary plan section on line indicated by $x^{10}-x^{10}$, Figs. 4, 6 and 14, showing the position of parts at the completion of a backward stroke of the conveyer. The cut-off is shown in position with chute open for filling a can which appears in place thereunderneath. The conveyer-fingers are shown retracted in position they occupy during the rearward stroke. The position which said fingers are forced into at the initial forward stroke of the conveyer-rod is indicated in broken lines; dotted lines indicate hidden parts. Fig. 11 is an enlarged fragmental detail elevation from plane indicated by line $x^{11}-x^{11}$, Figs. 6 and 10 to illustrate the device for operating in proper sequence the cut-off and the conveyer mechanism. Dotted lines indicate position of parts that are hidden, and broken lines indicate position parts assume at the opening of the cut-off. The positions shown in solid and broken lines respectively in this view are the same as those shown in corresponding lines in Fig. 5. Fig. 12 is a section on line indicated by $x^{12}-x^{12}$, Fig. 11 looking in the direction of the arrows and omitting the rock shafts and bell-crank-levers shown in Fig. 11. Fig. 13 is a broken detached view of part of the feeding device with parts in position to give access for cleaning and adjusting interior parts thereof. In this view the hopper is shown suspended from its cap after the chute, the brushes, and the distributer disk have been removed. Fig. 14 is a sectional elevation on line indicated by $x^{14}-x^{14}$, Figs. 6 and 10. The feeding device is closed and the cut-off open. The position occupied by the regulating handle when the distributer is open to its fullest extent is shown in broken lines. Fig. 15 is an enlarged fragmental plan section on line indicated by $x^{15}-x^{15}$, Figs. 14 and 16. Fig. 16 is an enlarged section on line indicated by $x^{16}-x^{16}$, Fig. 15, showing the means for obtaining an even distribution into the chute. The centrifugal distributer is shown open to its fullest extent. Fig. 17 is an enlarged fragmentary detail showing the connection of the flexible stream-evening arms with the sleeve. Fig. 18 is an enlarged detail of the device for fastening the stirrer-strand to the centrifugal head. Fig 19 is a plan of the gate viewed from line $x^{19}$, Figs. 4, 5 and 14. Fig. 20, Sheet 3, is a detail in plan section on line $x^{20}$, Fig. 6, of the adjustable bearing of the vertical shaft. Fig. 21, Sheet 3, is a fragmentary detail in axial section of said bearing and shaft. Figs. 22, 23 and 24 are fragmental views to illustrate the automatic means by which the power-belt is shifted from the tight pulley to the loose pulley when the last can or other receptacle has passed from the magazine-plate to the scale-pan. Fig. 22 is a fragmental plan view from the rear of the machine showing the machine in operation. Fig. 23 is a fragmental elevation from the front of the machine, showing the machine in operation with the fragment of the last can ready to be removed from the magazine-plate. Fig. 24 is a fragmental section on lines $x^{24}$, Figs. 22 and 23, after the last can has left the magazine-plate. Fig. 25 is a longitudinal, sectional elevation viewed from the rear of the machine, to illustrate the means for stopping the vibrator when the conveyer reaches its home position, which occurs just before the can is filled and the draft made. Fig. 26 is a vertical, sectional detail to illustrate the form of evener or feed-device for delivering tea to the chute. Fig. 27 is a plan of the rotary-distributer shown in Fig. 26. Fig. 28 is a side elevation of the distributer shown in Fig. 27. Fig. 29 is a perspective view of the rotary distributer shown in Fig. 26. Figs. 30 and 31, Sheet 4, are fragmental perspective top and bottom views respectively, of the rear and front vibrator-plates. Fig. 32 is a vertical section of the car proper, with the enlargement applied; said can and enlargement being full of loose material. Fig. 33 shows the material settled into the can proper, and the enlargement disconnected.

The machine broadly considered comprises in a general way the combination of feeding means 1, stream-evening means 2, delivering means 3, means for temporarily enlarging the receptacle or filling the receptacle overfull, weighing means 4, electric controlling means, conveying means 5, and settling means 6, all of which means are carried by a frame indicated in a general way by 7, comprising a base 8, uprights 9 and 10, and a cross-head 11 composed of upper and lower bars 12 and 13, connected to each other by end-pieces 14 fastened to said uprights 9 and 10.

The cross-head 11 may be variously constructed. It may be cast or otherwise formed of a single piece, and is provided with alining bearings 15, 16, for alining a vertical shaft 17 which is carried by an adjustable bearing 18 controlled by a lever 19 by means of which said shaft may be moved axially up and down. Said lever 19 is pivoted at 20 to a hanger 21 which is pivoted to the frame at 22, and said lever is connected by a link 23 to a regulating handle 24 which is pivoted at 25 to an indicator-plate 26 that is provided with perforations 27 to receive a pin or detent 28 of the regulating handle 24, thus to hold the handle and the shaft at determined positions. Said shaft 17 is driven with a pulley 29 driven by a belt 30 led over two lead pulleys 31, 32, which are carried by the frame at a distance from the shaft-pulley 29 so as to allow a measure of up-and-down movement of the shaft without derangement of the means for rotating the shaft. In each of the alining bearings is a shouldered collar 33 supported by horizontal adjusting screws 34, 34'; the purpose being to hold the shaft coaxially of a hopper 35 and the cylindrical outlet 36 thereof.

37 is a centrifugal distributing head fastened on the shaft 17 above a disk 38 that is of greater diameter than, and is adapted to open and close the cylindrical outlet 36. Said head 37 is provided with tangential arms 39 of less radius than the cylindrical outlet so that the head may enter said outlet, thus to allow the disk to be raised into the position shown in Fig. 14, to close the outlet from the hopper. The disk and head when partially or wholly lowered, provide a laterally-opening space below the mouth of said outlet through which material passing through said outlet may be discharged centrifugally over the rim of the disk by the action of the arms 39.

The disk 38 is loose on the shaft 17 so that the shaft may rotate therein, and is supported by a sleeve 40 which is held on said shaft by a set-screw 41 and is provided with a plurality of brushes in the form of flexible fingers 42 which are preferably rubber tubes of small diameter stuck onto and supported by wires 43 that project from the sleeve 40 and tightly fit on and distend the inner ends of the tubes respectively.

The centrifugal head 37 is tightly screwed on an arbor 44 at the lower end of the shaft 17 so as to rotate with, and move up and down with said shaft. The disk 38 is loosely mounted on said arbor 44 to move up and down with the shaft, and is held against rotation by a stay 45 consisting of a wire having an upright finger 46 extending into a hole 47 in a flange 48 around the outlet 36 of the hopper 35.

A loosening device is connected with the shaft 17 to keep the material in the hopper and its cylindrical outlet loose within and free from sticking against the walls of the hopper and outlet. This device, as clearly shown in Fig. 14 and partly detailed in Figs. 15 and 16, comprises an arm 49 fixed to and extending outward from the shaft 17 inside the hopper 35; a cutter comprising a strand 50 fastened at one end to the stirrer-arm and led thence downward through the outlet 36, and connected with the distributer-head 37, and a tie 51 just above the hopper-outlet 36 to hold the strand in, so that the upper portion of the strand is aslant parallel with the inside wall of the conical hopper 35, and the lower portion of the strand is vertical parallel with the inside wall of the cylindrical outlet 36. The strand 50 is preferably a thin piano wire 1/64 inch in diameter. Said arm 49 may be a thin strip, rod, or bar fixed in a bushing 52 that is tightly inserted into the upright shaft 17. The lower end of the cutter strand is preferably detachably secured to the centrifugal distributing head 37 by being clamped in a notch 53 in one of the centrifugal arms 39 and bent around and clamped by a clamp-plate 54 set beneath a pin 55 and secured by a screw or bolt 56 to said arm.

57 designates the hopper top or cover removably fixed to the frame by bolts 58 in brackets 59.

60 designates the inlet to the hopper, and 61 a conduit from a bin or receptacle $a$ by which the material to be weighed may be constantly or otherwise supplied to the hopper.

62 designates a washer around the shaft 17 to cover the opening 63 in the cover 57 through which the shaft 17 extends.

64 designates a spring held by a bolt 65 to retain the washer 62 in place to make the hopper dust-tight.

The hopper is adjustable vertically toward and from the stationary top 57 by means of hanger-rods 66 screwed into the top 57 and extending downward therefrom through perforated lugs 67 on the hopper 35. The hopper is supported on the hangers 66 by struts 68 provided with arms 69 and 70; the upper strut-arm 69 being perforated and slidably mounted on the hanger-rod 66, and the lower strut-arm 70 being slotted to swing onto and off from the hanger-rod 66, the struts being supported and clamped in place by thumb-nuts 71. By removing from below the hopper the parts which would interfere with its downward movement, loosening the thumb-nuts 71, and then swinging the struts 68 from above the thumb-nuts, the hopper may be lowered into the position shown in Fig. 13, thus to give access to the interior of the hopper.

72 designates a downwardly-tapering shell of the stream-evener 2 for supplying to the chute 73 an even stream of the material to be weighed. The upper end of said shell is cylindrical, and said cylindrical portion contains the flexible fingers 42 which are preferably of sufficient length to brush against the wall of the shell, as clearly shown in Figs. 14 and 15. Said shell also contains the distributer-disk 38 and these parts are raised and lowered by the operation of the regulating handle 24 which, when in its depressed position, as shown in Fig. 14, depresses the free end of lever 19 and raises the shaft 17 and holds the disk 38 tightly against the outlet end of the hopper to close the same. As the handle 24 is raised, the shaft 17 and the fingers 42, the disk 38, and the centrifugal head 37 are all lowered correspondingly, thus leaving an open space below the outlet from the hopper through which material may pass from the hopper into the evener-shell 72. In Fig. 16 the disk and the evener fingers are shown in their lowest position, the same being that into which they will be brought by moving the handle 24 into the position shown in broken lines in Fig. 14.

In practical operation, the shaft 17 being driven at a determined speed by the belt 30, will rotate the loosener 49, 50 and 51, the centrifugal head 37, and the fingers 42; whereupon the material contained in the hopper will be cut loose from the walls of the hopper and its outlet by the loosener, and the material which comes into contact with the arms of the centrifugal head will be thrown by said arms outwardly and discharged over the edge of the distributer-disk 38 and toward the walls of the shell 72, where it will be acted upon by the flexible fingers 42, and thereby evenly distributed over the downwardly-tapering wall of the shell 72 down which it will pass in a spiral course to the chute 73, down which it will pass in a regular stream. The handle 24 is adapted to be swung from and toward the plate 26 to withdraw and insert the pin 28. By thus withdrawing the pin and then raising or lowering the handle 24 and then securing said handle in various positions by inserting the pin 28 into the required perforation 27, the machine can be so set that the delivery of material to the shell 72 will be regulated exactly as desired.

The shell 72 is detachably connected with the hopper 35 by bolts 74 and thumb-nuts 75. The chute 73 is detachably connected with the distributer-shell 72 by bolts 76.

When it is desired to lower the hopper as suggested above, the operator will first unscrew the thumb-nuts 75 and then remove the shell 72 together with the chute. This leaves the sleeve 40 and the set-screw 41 exposed, whereupon the set-screw may be loosened and the sleeve removed, thus allowing the disk 38 to be withdrawn from the arbor 44 and removing all impediments to the lowering of the hopper 35. Thereupon the struts 68 may be loosened, and swung out, and the hopper lowered as above suggested.

It is important in practical use that the amount of material delivered from the chute 73 into the can or other receptacle in which it is to be weighed, shall be invariably the same for each of a series of packages, and the delivering means of this weigher is therefore provided with cut-off means operable by scales 77.

78 is the gate for the chute 73. The same is carried independently of the chute by a link 79 pivoted to the gate at the lower end thereof by a pivot 80, and loosely connected to the top of the gate by a slotted arm 81 which serves as a guide and stop for the upper end of the gate.

82 designates guides at the sides of the top of the open mouth of the chute 73, between which guides the gate 78 is resiliently held by spring 83 connected with the link 79 which is pivoted at 84 to the gate-operating-arm 85, to which the other end of the spring 83 is connected by the arm 86.

87 is a bar extending across the mouth of the chute at the top thereof between the guides 82 to hold the gate which is provided at its upper end with a hook 88 to engage the bar 87 when the gate is closed.

The gate-operating lever 85 is a rigid arm on a rock-shaft 89 which is connected by an arm 90 with a spring 91 which is adjustably connected by a notched handle 92 with the frame of the machine by means of pin 93 upon which the notches 94 of the handle will catch to hold the handle so as to give such greater or less tension to the spring as may be required to force the gate down into the chute-closing position shown in Fig. 4, when the rock-shaft is left free to respond to said spring.

95 is a stop rigidly fixed to the rock shaft to resist the spring when the gate 78 has reached said closed position.

96 is a link connected at one end with an arm 97 of the rock-shaft 89, and at the other end with a latch-shaft-arm 98 which is rigidly connected with a latch-shaft 99, that carries a latch 100 adapted to engage a keeper 101 which is operable by an electromagnet 102 that is energized by an electric circuit 103 adapted to be closed by the scales 77 when overbalanced by the weight of the filled container, as can 104, when the same as appropriately charged.

By means of the elements just described, the latch may be released and the gate 78 closed in an instantaneous manner to cut off the flow of material through the chute 73 into a can or other container to be weighed on said scales.

105 is a circuit-maker to close the electric-circuit 103 and operable by the scales on the descent of the weighted pan 106 of the scales bearing a weight, as 107, to keep the circuit open while the can is being filled. The gate 78 may be again opened and latched in its open position by manipulation of manual means, as for instance, by lifting up on the stop-arm 95 until the latch is again brought into position to be caught by the keeper. Said stop 95 thus affords manual means for bringing the gate to its latched open position.

108 designates a scale-pan in the form of a plate in front of and below the mouth of the chute 73 and on a level with the top of a table 109, that is fastened to the frame 7 and extends horizontally in front thereof for a considerable extent in order to give time for shaking the filled packages after they have been weighed. Said scale-pan 108 is free from all parts of the table and is detachably connected with the beam of the scale by a standard 110 seated in a socket 111 carried by the scale-beam.

In order to insure rapid weighing, automatic means are provided for returning the chute-gate 78 to its latched open position. For this purpose and for other purposes which will hereinafter appear, provision for application of power to the machine is made, as indicated by a power belt 112 which may apply power to a pulley 113 of the line-shaft 114, which carries a loose pulley 115 to which the belt may be shifted by the belt-shifter 116, as indicated in Fig. 6, when it is not desired to drive the machine.

The path formed by the table to and from the scale-pan is straight and horizontal and at the normal level of the scale-pan, so that the cans 104 may move from one to the other end of the path in the simplest and most practical manner.

117 is a sprocket-wheel on the line shaft 114 to drive a sprocket-chain 118, which in turn drives a sprocket-wheel 119 arranged to drive a crank-shaft 120 which has adjustably mounted at one end thereof a crank 121, the pin of which works in a slotted link 122 that is pivotally connected with an arm 123 that is adjustably fixed on the gate-operating rock-shaft 89.

b designates set-screws for adjustably fixing the crank 121 on the crank-shaft and the cut-off rock-shaft-arm 123 on the rock-shaft. The crank 121, the link 122, and the rock-shaft-arm 123 are adjusted to such relative positions that when the rock-shaft is in the gate-closing position, the crank-pin, upon the revolution of the crank 121, will engage the closed end of the slotted link 122 and will draw the link rearwardly, thus to rock the rock-shaft sufficiently to lift the gate 78 into the open position shown in Fig. 5. Preferably, the direction of the crank 121 is forward at the upper portion of the stroke, and the pivot 124 of the rock-shaft arm 123 is approximately on a level with the pin of the crank 121, as shown in broken lines in Fig. 5, at the beginning of the operative portion of its stroke, so that as the crank-pin operates the slotted link, the line of draft will be in the most effective direction for operating the cut-off rock-shaft, as indicated by the two positions of the link shown in Fig. 5. When the rock-shaft is thus rocked to open the gate, the latch 100 comes into the latching position shown in Figs. 3, 5 and 14, and is caught by the keeper 101, to be released again when the scales are overbalanced by a weight on the scale-pan, whereby the electric-circuit is closed to energize the electromagnet to lift the keeper 101 which is an armature of said magnet, and to withdraw the same from the path of the latch. When the rock-shaft is thus latched in position to hold the gate open, contact is made in the electrical circuit between a contact-spring 125 and contact-pin 126 that is carried by the latch-shaft 99 to break the circuit whenever the latch moves from its latched position. By this means the circuit is always broken either at the circuit-maker 105 or at the latch, except at the moment before the latch is released by the operation of the circuit-maker 105, when the scale-beam tilts under the weight of the package on the scale-pan 108.

127 is a spring-operated belt-tightener for tightening the sprocket-chain 118.

It is evident that the time required for filling a can depends upon the rapidity and the volume of the stream of material flowing thereinto from the chute 73, and consequently the operation of the gate cannot be allowed to occur at each rotation of the sprocket-wheel 119. The sprocket-wheel 119 is loosely mounted on the crank-shaft 120, and clutch means are provided for connecting the sprocket-wheel with the shaft when it is desired to rotate said shaft. For this purpose the sprocket-wheel is provided with a circular series of detents 128, and the crank-shaft is provided with an arm 129 to which is pivoted a dog 130 by a pivot 131. The dog 130 is normally held by a spring 132 in position to engage the detents 128. 133 is a trip arranged to engage the heel 134 of the dog 130 and to withdraw said dog from the path of the detents 128, and to hold the dog in that position so long as the trip 133 is in tripping position. Said trip is mounted on a bell-crank-shaft 135, and is operable by a link 136 pivoted at one end to an arm 137 of the bell-crank and at the other end to an arm 138 of the gate-operating rock-shaft 89.

The trip 133 and the rock-shaft 89 are relatively arranged so that when the rock-shaft begins to turn to close the gate, the trip will be withdrawn from the heel of the dog 130, thus allowing the spring 132 to throw the dog into position to engage a detent 128. Upon such engagement the arm 129 of the crank-shaft will be carried around with the sprocket-wheel 119, thus rotating the crank-shaft 120 and consequently the crank 121, so that within the period of one rotation of the sprocket-wheel 119 the slotted link 122 will be operated to retract the rock-shaft 89 and the gate 78.

The trip 133 is so arranged relative to the other parts that when the gate is open the trip will be in the path of the heel of the dog 130 at a point forwardly from that at which the crank has retracted the slotted link 122 sufficiently to open the gate; so that shortly after the gate is opened the heel 134 of the dog 130 will engage the trip 133 and thereby the dog 130 is withdrawn from the detents, thus releasing the crank-shaft 120 and allowing the sprocket-wheel 119 to continue its rotation without operating the crank-shaft 120.

139 is a stop to prevent the dog from rotating too far on its pivot 131, so that when the dog has been withdrawn from the path of the detents 128 the dog serves as a stop to hold the arm 129 of the crank-shaft from further rotation until the trip-arm 133 is withdrawn from the path of the heel of the dog by the gate-closing movement of the rock-shaft 89.

The top of the table 109 is provided with a slot 140 to accommodate the scale-pan 108 and two vibrator plates 141, 142, the former of which plates is beveled or rounded at the end next the scale-pan 108 to allow the receptacles to slide freely from the scale-pan onto said vibrator plate 141. The scale-pan is likewise rounded at its front end to receive the receptacle without interfering with the forward movement thereof. Means are provided for moving the cans from the magazine-plate 143 that is a plain part of the stationary table on which said cans may be placed by the operator, onto the scale-pan 108, from thence to the receiving vibrator-plate 141, and thence onto the final vibrator-plate 142 thence to a stationary rest 144 at the rear end of the table, onto which rest the cans will be deposited after they have passed the vibrator-plates.

The operation of advancing the receptacles toward the tail of the machine, and the operation of shaking the receptacles to settle the material therein, must be performed intermittently in order that the receptacles may be stationary during the operation of filling, and that the scales may be undisturbed at the moment the weighing takes place. For this purpose the means for vibrating the vibratory plates and the means for conveying the receptacles along the table over the scale-pan and said plates, are set in motion from the intermittently-moving crank-shaft 120 by a crank-arm 145 on the crank-shaft 120, a connecting-rod 146 connected with said crank-arm, a bell-crank journaled to the frame at 147 and provided with arms 148 and 149, the first of which is connected with the connecting-rod 146 and the latter connected by a connecting-rod 150 with the conveyer.

The conveyer comprises a number of fingers 151 that are respectively pivoted by pivots 152 and 153 to a reciprocating finger-rod 154 and a sliding carriage-bar 155. Said finger-rod 154 is pivotally connected with the connecting-rod 150 by means of a sleeve 156 loosely mounted on a pin 157 that is fixed to a clamp 158 adjustably clamped upon the reciprocating finger-rod 154.

The carriage-bar 155 is slidably connected with the table by guides 159, 160, 161, and is provided with a stop at 162 to be engaged alternately on its opposite sides by adjustable stops 163 and 164 spaced apart therefrom on the rod 154, whereby a limited movement of the rod 154 relatively to the carriage bar 155 is provided for the purpose of swinging the fingers 151 into and out of the can-way which is formed between the guide-rail 165 that runs between guide-rollers 166 which are carried by table 109. Said guide-rail 165 is adjustably connected with the carriage-bar 155 by a slotted head 167 and an arm, at 162, and the guide-rollers 166 are adjustable transversely of the table, being mounted for this purpose on rods 168 that are adjustably supported in a horizontal position by standards 169, in which they are clamped by clamp-screws 170, thus to allow the horizontal can or package way between the guide-rail 165 and the carriage-bar 155 to be increased or decreased in width to accommodate cans or other containers of various sizes. In Fig. 7 the arrow-headed leader from the character 5' terminates in said can or package way, thus serving to definitely point out said way in addition to indicating the conveying means in a general manner. Said standards and guide-rods are arranged to allow the guide-rail to be shifted clear to the side of the table opposite the carriage-bar 155, thus to leave an open space above the table for the removal of the vibrator-plates 141 and 142 when desired. When the rail is thus shifted, the rods 168 project from the standards to form, outside the table, brackets on which said plates may be supported conveniently at hand for replacement.

The carriage-bar 155 and the rail 165 and head 167 attached thereto, form a carriage having sufficient inertia to hold stationary the pivots 153 on which the fingers swing until the movement of the finger-rod alongside the carriage-bar has caused the arm at 162 to engage either the stop 163 or the stop 164 on the carriage-bar, whereupon the further movement of the finger-rod causes the carriage to move likewise, thus carrying the fingers in one or the other direction as the case may be, at the forward movement. The fingers will thus first be projected into the can-way between the carriage-bar and guide-rail, and will then be moved along such way to advance such cans or other containers as may be in said way. This movement continues until the completion of the forward stroke of the finger-rod. Then at the initial return movement of said rod, the same operates as before to swing the fingers, but in the contrary direction, thus removing the fingers from the can-way until the arm at 162 engages the rear stop 164. Then the carriage with its fingers is returned to initial position ready for a repetition of the movements just above described. The forward movement of the finger-rod 154 carrying the fingers 151 moves the fingers into the path of the cans, and the fingers move the cans to the rail 165 and then along the rail.

171 is an inward extension of the rail 165 at the portion thereof which moves into and from position above the scale-pan 108, so that when the first one of the conveyer-fingers 151 forces a can 104 onto the scale-pan 108 at the forward movement of the carriage, the inward extension 171 of the rail 165 prevents the can from moving into line with the inner edge of the rail 165, so that on the return movement of the carriage which withdraws the extension 171 away from above the scale-pan 108, the can 104 will be left free from any contact except that with the scale-pan upon which it stands.

By reference to Fig. 8 the position into which the fingers 151 are retracted, upon the initial retracting movement of the conveyer-rod 154, will be seen; said fingers being at the initial movement of said rod 154 drawn entirely out of the path of the cans. The amplitude of the carriage movement is equal to the length of the scale-pan, and the forward limit of the carriage movement must be such as to cause the conveyer-fingers which have moved a can onto the scale-pan 108 to advance said can only to a central position on the scale-pan. It is therefore necessary in operating upon cans of different diameters that the carriage be adjustable relative to the connecting-rod 150. This adjustment is accomplished by the clamp 158.

To adjust the machine to operate upon cans of a determined diameter, the machine will be brought into position with the conveyer-fingers 151 at their farthest forward limit; then the clamp 158 and the set-screws 170 and the thumb-nut 172, thus leaving the carriage free to be adjusted lengthwise of the table, and the rail 165 to be adjusted laterally of the table. Then the carriage may be moved by means of the rod 155 without displacing the position of the fingers relative thereto, and the rail 165 being in position to allow a can of the desired diameter to be placed upon the scale-pan, such can will then be brought into central position on the scale-pan, and then the carriage and the rail 165 will be adjusted so as to bring the fingers 171 against the rear side of the carriage, and the extension 171 against the can, thus centrally located. Then the clamp 158, the set-screws 170, and the thumb-nut 172 will be tightened, whereupon the machine is ready for operation upon cans of the size to which it has thus been regulated.

By the construction above detailed, each rotation of the cam-shaft 120 effects a complete forward and backward movement of the carriage; consequently, when the shaft is rotated and the chute is closed, the carriage makes a forward and backward movement, thus advancing the cans each time the chute is closed.

Since the rotation of the crank-shaft as above explained, can only occur when the rock-shaft is in position to allow the gate 78 to close the chute, there is no displacement of the can from below the chute while the chute is open.

173 and 173' designate cams, and 174—174' designate vertically-reciprocating vibrator operating-rods slidably mounted in vertical ways 175 and 175' and engaging blocks 176 that support and vibrate the vibrator-plates 142 and 141 vertically. Said cams are fixed on a shaft 177 carried by adjustable hangers 178 and 179, and adapted to be clutched with and rotated by a pulley 180 which is driven by a belt 181 led from a pulley 182 on the line-shaft 114.

The pulley 180 is held clutched with the cam-shaft 177 by a spring-pressed shifting device 183, the spring 184 of which tends to normally hold the pulley 180 in clutching position.

185 is a tripping device carried by and moving with the pin of the connecting-rod 150 which operates the conveyer-rod 154.

186 is an adjustable button on the trip 185 to engage the shifting device 183 at the close of the return movement of the connecting-rod 150, thereby to withdraw the pulley from clutching position and to hold it withdrawn until the connecting-rod 150 makes another forward stroke. Said trip is also provided with another adjustable button 187 arranged to engage a lever 188 to lift a weighted arm 189 that normally depresses the weight-carrying end of the scale-beam by engaging with an insulated arm 190 at all times except when the button 187 retracts the lever 188. Said button 187 is arranged to retract the lever 188 at the close of the rearward movement of the connecting-rod 150.

By the means just described the scales are held in position with the scale-pan 108 elevated to a level with the vibrator weight at all times when the fingers are shifting the can, and also during the greater period of the retraction of said fingers; so that while the cans are being moved during the greater portion of the time that the can is being filled, the scale-pan is positively supported by the pressure of the weighted arm, and it is only at the close of the retracting movement of the carriage that the scales are left free to effect the weighing.

In practical operation the operator will adjust the regulating handle 24 to such position that the discharge of material over the edge of the disk 33 will be sufficient to supply to the chute during the forward and backward travel of the carriage, nearly enough material to fill the can, so that the filling of the can will be practically completed at the moment the carriage stops on its return.

The delivery of material to the chute is continuous, and since the gate 78 is closed during the forward movement of the carriage, an accumulation of material occurs in the chute against the gate so that when the gate is open a deposit of considerable charge suddenly occurs, thus largely filling the can at once, after which the material fills more slowly into the can until the can is sufficiently filled.

In order that a sufficient amount of material may be delivered to each can to completely fill the same when the can has been subjected to the action of the vibrator-plates, detached enlargements 191 are provided to be manually fitted into the tops of the cans by the operator before the cans reach the scale-pan, and to be removed from the cans after the same have reached the rest 144 at the end of the table.

The enlargements 191 serve as a means for temporarily enlarging the cans so that the enlarged cans will hold the bulk of enough loose material to fill the cans proper when settled. The lower ends of the enlargements telescope with the upper ends of the cans so as to be supported. The loose material may extend to the top of the enlargements 191, and when settled the material may all be within the can proper, or the attendant may press the surplus into the can proper, and then remove the extension. (See Figs. 32 and 33).

If it is desired that the settled material occupy a space less than the entire capacity of the receptacle, the enlargements 191 may be dispensed with and the receptacle charged to the desired weight with loose material, and then the loose material settled into the allotted space. In any event, if the bulk of the loose material is greater than the allotted space it may be said that the receptacle is overfull and that the bulk of the material must be reduced by settling.

The vibrator-plates 141, 142 are loosely connected together by means of a strap 193 fixed to the vibrator-plate 142, and provided with perforations 194 through which pins 195 fixed to the first vibrator-plate 141 extend. Said strap supports the forward end of the vibrator-plate 141 while the rear end thereof is supported by legs 192.

When the vibrator-cams are rotated, the vibrator-plate 142 is rapidly moved up and down by the action of said cams and the force of gravity, and consequently the material contained in the cams on the vibrator-plates is jolted and shaken into a compact form. The vibration of the plate 141 is comparatively slight at the end adjacent the scale-pan so that the jolted action of the vibrator-plates is gradually transmitted to the cams and increases in violence as the cans progress along the vibrator-plates until they pass the slotted strap 193 and reach the vibrator-plate 142. By adjusting the bearings 178 and 179, the violence of the vibratory action at the opposite ends of the vibrator-plate 142 may be varied. In some instances it may be advisable to adjust the bearing 178 to a greater height than the bearing 179 so that the cam 173' will carry the vibrator-rod 174', which will be driven higher than the rod 174, thus giving greater amplitude of movement to the vibrator at the discharging end thereof than at the receiving end; or by reverse adjustment of the hangers 178, 179, a reverse effect will be secured.

196 designates a scale-box in the table in which the scales are mounted.

197 is the battery-box in which the batteries 198 may be stored. 199 is a drawer to receive any material which may be accidentally spilled from the chute 73. Said drawer is located at the forward end of the scale-box, and the slanting guide 200 below the scale-pan 108 is provided to direct any spilled material into the drawer.

The loosening device for handling tea is different in its detail from the loosening device for handling baking-powder, and like substances, in order to avoid breaking the brittle leaves of tea. Such tea-loosening device consists in a worm 201 mounted on a vertical shaft 17 inside the hopper 35 above the cylindrical outlet 36, and also above the distributer-disk 202 corresponding to the distributer-disk 38, except that it is located above the cylindrical outlet.

To fit the machine for handling all teas including the first variety of spider-leg tea, without damage thereto or producing any powder therefrom, the shaft 17 will be stripped of the parts shown attached thereto within the hopper 35, and the distributer-shell 72 and the parts 201, 202, will be substituted for the removed devices, as shown in Fig. 26.

The worm 201 is arranged to operate to lift the tea as the shaft rotates, thus keeping a loose body of tea on the face of the disk and worm, both being fixed to the shaft to rotate therewith.

To allow vertical adjustment for the different-sized receptacles or cans, means are provided whereby the carriage is adapted to be moved freely up or down either during the operation of the machine or when operation is discontinued by means of the handle 203 of the threaded shank 204 which screws into the seat 205, the seat being made integral with the base 8. Two shoulders 206, 206' are provided upon the shank 204 between which is seated the bored neck 207 of the table cross-head. The forked extremities of said cross-head are provided with integral collars 208 through, and securely fastened to which, the vertical table-guides 209 extend. Said guides are slidably mounted in ways 210, and the carriage-supporting brackets 211 and 212 being interposed between the integral collars 208 of the cross-head, are thereby raised and lowered with the cross-head which is operated by the screw-threaded shank 204. In this way the table which rests upon the brackets 211 and 212 may be readily adjusted to suit any height of can. To compensate for this vertical adjustment of the table, and to maintain a taut drive to the vibrator cam-shaft 177, a weighted arm 213 fulcrumed on the shaft 114 and carrying two idlers 214 and 215 under which the belt 181 passes, is provided. Whenever the table is raised or lowered, the belt is held taut by the weight 216 at the extremity of the weighted arm 213. A telescopic support 217 is provided at the tail end of the table under the rest 144 which may be adjusted by a clamp-screw 218 to any height that the table is raised, to thereby give rigidity to the same throughout. Thus I have produced an automatic weigher comprising feeding mechanism, stream-evening mechanism, delivering mechanism, weighing mechanism, conveying mechanism, electrical controlling mechanism, mechanism for temporarily enlarging the receptacles, and settling mechanism.

In practical operation all the different parts are adjusted to suit the process or particular work to be performed. The receptacles are brought into position to be advanced to the weighing mechanism, and if required, the receptacles are supplied with the enlargements before they reach the weighing mechanism, and the enlargements are free and are removed by hand after the material has been settled into the receptacles proper.

The material is discharged into the feeding mechanism, and by the feeding mechanism is loosened up and discharged into the receptacles in an even stream; said stream being interrupted by the weight of the material in the receptacle upon the scales, and the velocity and volume of the stream being such that it may be interrupted as the receptacles pass over the scales step by step.

It is intended that the machine will run continuously so that the receptacles may be advanced steadily step by step to and from the scale-mechanism, and so that when the receptacles have passed through the settling mechanism the bulk of material will be settled into the allotted space and the receptacles will be ready for closing.

It is obvious that many variations and changes may be made in the details of construction without departing from the spirit of my invention.

I claim:—

1. In an automatic weigher for weighing material in receptacles having a horizontal way in which the receptacles to be weighed travel to the filling and weighing mechanism of such weigher and from said filling and weighing mechanism, mechanism for temporarily enlarging the receptacles so that the receptacles may be enlarged, overfilled with a larger bulk, weighed, and settled, the enlargements being free to be removed substantially as and for the purpose set forth.

2. An automatic weigher having mechanism for temporarily enlarging the receptacles, mechanism for filling the enlarged receptacles with loose material to the desired weight and passing the receptacles along in succession, and mechanism for shaking the receptacles and thereby settling the loose material within the receptacles proper after they have passed from the weighing mechanism.

3. An automatic weigher having mechanism for temporarily enlarging the receptacles, mechanism for moving the enlarged receptacles in succession horizontally to and over the scales, mechanism for filling the enlarged receptacles with loose material upon the scales, mechanism for moving the filled enlarged receptacles horizontally from the scales, and mechanism for shaking the receptacles while they are moving from the scales and thereby settling the material within the receptacles proper.

4. A feeding mechanism comprising a hopper discharging downwardly through a central opening, a shaft vertically mounted in the hopper and extending through the opening and adapted for up and down adjustment, a disk upon the shaft in position to regulate the passage through the opening by adjusting the shaft, and an agitator carried by the shaft.

5. A feeding mechanism comprising a receptacle discharging downwardly, adjustable means for regulating the discharge, an agitator for breaking up the material above the discharge, and brushes for distributing the material below the discharge.

6. A feeding mechanism comprising a receptacle discharging downwardly, a shaft mounted vertically and adjustably in the discharge opening, a disk upon the shaft for regulating the flow through the opening, and a centrifugal distributing head above the disk.

7. Stream-evening means comprising a downwardly-tapering shell, a receptacle discharging into the shell from above and at its axial center, a shaft mounted in the discharge-opening and extending into the shell, means upon the shaft for regulating the flow to the shell, and brushes upon the shaft below the regulating means.

8. Stream-evening means comprising a downwardly-tapering shell, a hopper discharging downwardly into the shell, a shaft mounted vertically in the hopper and extending downwardly into the shell, means upon the shaft for adjustably regulating the flow from the hopper to the shell, a centrifugal distributing head upon the shaft and discharging into the shell, and brushes upon the shaft in the shell below the distributing head.

9. In an automatic weigher, a stationary table, a scales mounted with the scale-pan in line with the surface of the stationary table, a vibrating table at the opposite side of the scale-pan from the stationary table, means for passing receptacles from the stationary table over the scale-pan to the vibrating table step by step, and means whereby the receptacles are filled to the desired extent upon the scale-pan, the operation of the scale-pan serving to regulate the filling of the receptacles.

10. In an automatic weigher, a stationary table, a scales mounted with the surface of the scale-pan in line with the surface of the stationary table, a vibrating table at the opposite side of the scale-pan from the stationary table, means for passing receptacles from the stationary table over the scale-pan to the vibrating table step by step, means for filling the receptacles upon the scale-pan, and means whereby the operation of the scale-pan regulates the passage of the receptacles and the filling of the receptacles.

11. A loosening device comprising the combination with a hopper, a shaft vertically mounted in the hopper and a distributer-head upon the shaft, of an arm extending outwardly from the shaft above the distributer-head, and a strand attached to the outer end of the arm and extending downwardly and attached to the distributer-head.

12. A loosening device comprising the combination with a hopper, a shaft vertically mounted in the hopper and a distributer-head upon the shaft, of an arm extending outwardly from the shaft above the distributer-head, a strand attached to the outer end of the arm and extending downwardly and attached to the distributer-head, and a tie connecting the shaft to an intermediate part of the strand.

13. A feeding mechanism comprising a hopper having an opening discharging downwardly, a shaft vertically mounted in the hopper, an adjustable bearing upon the shaft, a lever pivotally mounted for moving the bearing up and down so as to move the shaft up and down, a regulating-handle, a connection between the regulating-handle and the lever, an indicator-plate, and a detent carried by the regulating-handle to engage the indicator-plate so as to raise or lower the shaft in the hopper and hold the shaft in its adjusted position.

14. A feeding mechanism comprising a hopper discharging downwardly through a central opening, a shaft mounted vertically in the hopper and in said opening, means for adjusting the shaft up and down, a distributer-head on the lower end of the shaft in said opening, and a plate upon said shaft below the distributer-head and large enough to close said opening, so that by adjusting the shaft up and down the feed from the hopper may be regulated.

15. A feeding mechanism comprising a hopper discharging downwardly through a central opening, a shaft vertically mounted in the hopper and extending through the opening and adapted for up and down adjustment, a disk upon the shaft in position to regulate the opening, and means for holding the disk against rotation.

16. A feeding mechanism comprising a hopper discharging downwardly, a shaft mounted vertically in the hopper, a cover for the hopper, said shaft extending through the center of the cover, and a washer fitting closely around the shaft upon the cover to prevent dust passing downwardly through the cover.

17. A feeding mechanism comprising a hopper discharging downwardly through a central opening, a shaft mounted vertically and adjustably in the discharge-opening, and a disk removably mounted upon the shaft in position to close and regulate the flow through the opening by the adjustment of the shaft.

18. A chute discharging downwardly, a gate slidingly mounted to open and close the chute, a rock-shaft, an arm rigidly fixed upon the rock-shaft, a link connecting the arm to the gate, an adjustable spring for holding the gate yieldingly closed, a second arm extending from the rock-shaft, a link connected to the second arm, a latch-shaft, a latch-shaft arm rigidly connected to the latch-shaft and connected to the link, a latch carried by the latch-shaft, a keeper to be engaged by the latch, an electro-magnet for operating the keeper, and means whereby the electro-magnet is energized by the depression of the scales so that when the desired weight is attained the magnet is energized to release the gate, and the gate instantly closed by the action of the spring.

19. In an automatic weigher, a stationary table, a scales mounted with the scale-pan in line with the stationary table, a vibrating table in line with the scale-pan, a second vibrating table in line with the first vibrating table, means for passing receptacles from the stationary table over the scale-pan to the vibrating tables, means for operating the vibrating tables at different rates of speed and different intensity, means for filling the receptacles upon the scale-pan to the desired extent, the weight of the filling serving to operate the scale-pan and set into operation the mechanism for advancing the receptacles and operating the vibrators.

20. In an automatic weigher, a stationary table, a scales mounted with the scale-pan in line with the stationary table, a settling mechanism at the opposite side of the scale-pan from the stationary table, a series of receptacles adapted to be mounted upon the stationary table, means for temporarily enlarging the receptacles, means for advancing the receptacles from the stationary table over the scale-pan to the settling mechanism, and means for filling the receptacles overfull upon the scale-pan.

21. In an automatic weigher, a stationary table, a scales mounted with the scale-pan in line with the stationary table, settling mechanism at the opposite side of the scale-pan from the stationary table, a second stationary table beyond the settling mechanism, and means for advancing the receptacles from the first stationary table over the scale-pan through the settling mechanism to the second stationary table, and means for filling the receptacles to the desired extent upon the scale-pan.

In testimony whereof, I have hereunto set my hand at Los Angeles, California, this 23d day of October, 1909.

CHARLES L. BOND.

In presence of—
JAMES R. TOWNSEND,
M. BEULAH TOWNSEND.